(12) United States Patent
Sakellarides et al.

(10) Patent No.: US 11,318,721 B2
(45) Date of Patent: May 3, 2022

(54) METHOD OF FORMING A FORMABLE POLYESTER FILM

(71) Applicant: Toray Plastics (America), Inc., North Kingstown, RI (US)

(72) Inventors: Stefanos L. Sakellarides, East Greenwich, RI (US); Paige Manuel, Newport, RI (US); Jan Moritz, Bristol, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 231 days.

(21) Appl. No.: 16/727,123

(22) Filed: Dec. 26, 2019

(65) Prior Publication Data

US 2020/0139690 A1 May 7, 2020

Related U.S. Application Data

(63) Continuation of application No. 15/336,249, filed on Oct. 27, 2016, now abandoned.
(Continued)

(51) Int. Cl.
*B32B 27/22* (2006.01)
*A63H 27/10* (2006.01)
(Continued)

(52) U.S. Cl.
CPC ............. *B32B 27/22* (2013.01); *A63H 27/10* (2013.01); *B32B 27/08* (2013.01); *B32B 27/36* (2013.01);
(Continued)

(58) Field of Classification Search
CPC ............ A63H 27/10; A63H 2027/1025; B32B 27/08; B32B 27/22; B32B 27/36;
(Continued)

(56) References Cited

U.S. PATENT DOCUMENTS

| 3,903,294 A | 9/1975 | Abella |
| 4,011,358 A | 3/1977 | Roelofs |

(Continued)

FOREIGN PATENT DOCUMENTS

| CN | 102582294 A | 7/2012 |
| EP | 0792741 A1 | 9/1997 |

(Continued)

OTHER PUBLICATIONS

JP-2006305866—A machine translation.*
(Continued)

*Primary Examiner* — Travis M Figg
(74) *Attorney, Agent, or Firm* — Nixon Peabody LLP

(57) ABSTRACT

A formable biaxially-oriented film includes a first layer. The first layer includes from about 10 to about 90 wt. % crystalline polyester and from about 10 to about 90 wt. % of a formability enhancer to assist in increasing the polymeric chain flexibility. The formability enhancer has a melting point less than about 230° C. The film has a MD and a TD Young's Modulus of at least 10% lower than a crystalline polyester film in the absence of the formability enhancer. The film may further include a second layer, which includes an amorphous copolyester. The second layer may be adjacent to or attached to the first layer.

25 Claims, 4 Drawing Sheets

Related U.S. Application Data

(60) Provisional application No. 62/355,695, filed on Jun. 28, 2016.

(51) Int. Cl.
  B32B 27/08 (2006.01)
  B32B 27/36 (2006.01)
  C08K 5/12 (2006.01)
  C08L 67/02 (2006.01)

(52) U.S. Cl.
  CPC ............... C08K 5/12 (2013.01); C08L 67/02 (2013.01); A63H 2027/1025 (2013.01); B32B 2250/244 (2013.01); B32B 2255/10 (2013.01); B32B 2255/205 (2013.01); B32B 2270/00 (2013.01); B32B 2307/51 (2013.01); B32B 2307/518 (2013.01); B32B 2307/54 (2013.01); B32B 2307/702 (2013.01); B32B 2307/704 (2013.01); B32B 2307/7246 (2013.01); B32B 2307/738 (2013.01); B32B 2439/40 (2013.01); B32B 2439/46 (2013.01); B32B 2439/70 (2013.01); C08L 2203/16 (2013.01); C08L 2205/025 (2013.01); C08L 2205/06 (2013.01); C08L 2207/04 (2013.01)

(58) Field of Classification Search
  CPC .......... B32B 2250/244; B32B 2255/10; B32B 2255/205; B32B 2270/00; B32B 2307/51; B32B 2307/518; B32B 2307/54; B32B 2307/702; B32B 2307/704; B32B 2307/7246; B32B 2307/738; B32B 2439/40; B32B 2439/46; B32B 2439/70; C08K 5/12; C08L 67/02; C08L 2203/16; C08L 2205/025; C08L 2205/06; C08L 2207/04
  See application file for complete search history.

(56) References Cited

U.S. PATENT DOCUMENTS

| | | | |
|---|---|---|---|
| 4,077,588 A | 3/1978 | Hurst | |
| 4,290,763 A | 9/1981 | Hurst | |
| 4,322,003 A | 3/1982 | Long | |
| 4,375,494 A * | 3/1983 | Stokes | B32B 27/08 |
| | | | 428/323 |
| 4,501,798 A | 2/1985 | Koschak | |
| 4,636,442 A | 1/1987 | Beavers | |
| 4,704,325 A | 11/1987 | Crocker | |
| 4,778,431 A | 10/1988 | Dudley | |
| 4,917,646 A | 4/1990 | Kieves | |
| 4,928,908 A | 5/1990 | Horii | |
| 5,075,354 A * | 12/1991 | Mitsuuchi | C08K 7/20 |
| | | | 523/217 |
| 5,108,339 A | 4/1992 | Kieves | |
| 5,145,833 A | 9/1992 | Prunier | |
| 5,164,248 A | 11/1992 | Fleury | |
| 5,209,972 A | 5/1993 | Super | |
| 5,260,387 A | 11/1993 | Boundy | |
| 5,279,873 A | 1/1994 | Oike | |
| 5,338,243 A | 8/1994 | Kieves | |
| 5,458,965 A | 10/1995 | Yoshinaka | |
| 5,616,496 A | 4/1997 | Frost | |
| 5,713,777 A | 2/1998 | Greenwald | |
| 5,770,301 A | 6/1998 | Murai | |
| 5,853,862 A | 12/1998 | Murai | |
| 5,856,017 A | 1/1999 | Matsuda | |
| 5,882,747 A | 3/1999 | Bria | |
| 5,942,320 A | 8/1999 | Miyake | |
| 5,958,552 A | 9/1999 | Fukuda | |
| 6,004,339 A * | 12/1999 | Wijay | B29C 55/26 |
| | | | 606/192 |
| 6,034,813 A | 3/2000 | Woodard | |
| 6,103,368 A | 8/2000 | Fukuda | |
| 6,188,512 B1 | 2/2001 | Woodard | |
| 6,194,054 B1 | 2/2001 | Peiffer | |
| 6,214,440 B1 | 4/2001 | Peiffer | |
| 6,221,112 B1 | 4/2001 | Snider | |
| 6,221,191 B1 | 4/2001 | Davis | |
| 6,291,053 B1 | 9/2001 | Peiffer | |
| 6,303,228 B1 | 10/2001 | Watanabe | |
| 6,391,410 B1 | 5/2002 | Peiffer | |
| 6,416,872 B1 | 7/2002 | Maschwitz | |
| 6,436,544 B1 | 8/2002 | Veyrat | |
| 6,455,141 B1 | 9/2002 | Woodard | |
| 6,543,208 B1 | 4/2003 | Kobayashi | |
| 6,607,815 B2 | 8/2003 | Bartsch | |
| 6,685,874 B1 * | 2/2004 | Dunton | B29C 49/0005 |
| | | | 264/328.17 |
| 6,743,512 B2 | 6/2004 | Murata | |
| 6,803,113 B2 | 10/2004 | Porter | |
| 6,803,443 B1 * | 10/2004 | Ariga | C08G 63/06 |
| | | | 525/437 |
| 7,115,320 B2 | 10/2006 | Tanaka | |
| 7,238,401 B1 | 7/2007 | Dietz | |
| 7,799,399 B2 | 9/2010 | Sargeant | |
| 7,919,158 B2 | 4/2011 | Seth | |
| 7,972,193 B2 | 7/2011 | Sarnstrom | |
| 8,236,399 B2 | 8/2012 | Chicarella | |
| 8,323,759 B2 | 12/2012 | Chicarella | |
| 8,399,080 B2 | 3/2013 | Chicarella | |
| 9,186,593 B2 | 11/2015 | Chicarella | |
| 2001/0019759 A1 | 9/2001 | Baratucci | |
| 2002/0094396 A1 | 7/2002 | Ward | |
| 2002/0182389 A1 | 12/2002 | Dobler | |
| 2004/0033382 A1 * | 2/2004 | Kendig | B65B 7/2885 |
| | | | 53/442 |
| 2004/0076821 A1 | 4/2004 | Janssens | |
| 2004/0166337 A1 | 8/2004 | Chang | |
| 2005/0100723 A1 | 5/2005 | Hiroyuki | |
| 2005/0118442 A1 * | 6/2005 | Itoh | B32B 15/08 |
| | | | 428/458 |
| 2005/0119359 A1 * | 6/2005 | Shelby | C08J 5/18 |
| | | | 521/50 |
| 2005/0208282 A1 | 9/2005 | Wood, Jr. | |
| 2007/0287017 A1 * | 12/2007 | Sargeant | C23C 14/20 |
| | | | 427/296 |
| 2008/0026667 A1 | 1/2008 | Anderson | |
| 2009/0022919 A1 * | 1/2009 | Chicarella | B32B 27/18 |
| | | | 428/35.9 |
| 2009/0226991 A1 | 9/2009 | Feldmen | |
| 2009/0246430 A1 | 10/2009 | Kriegel | |
| 2009/0323180 A1 | 12/2009 | Weber | |
| 2010/0028512 A1 | 2/2010 | Kriegel | |
| 2010/0314243 A1 | 12/2010 | Frost | |
| 2011/0076733 A1 | 3/2011 | Urano | |
| 2011/0087000 A1 | 4/2011 | Peters | |
| 2011/0120902 A1 | 5/2011 | Boswell | |
| 2011/0287199 A1 | 11/2011 | Chicarella | |
| 2011/0287200 A1 | 11/2011 | Chicarella | |
| 2013/0011631 A1 | 1/2013 | Sakellarides | |
| 2013/0344264 A1 * | 12/2013 | Chicarella | C23C 14/20 |
| | | | 264/510 |
| 2013/0344345 A1 | 12/2013 | Sakellarides | |
| 2014/0004286 A1 * | 1/2014 | Sakellarides | A63H 27/10 |
| | | | 428/36.6 |
| 2015/0118460 A1 * | 4/2015 | Mount, III | B32B 27/08 |
| | | | 428/209 |
| 2017/0368807 A1 * | 12/2017 | Sakellarides | B32B 27/22 |
| 2017/0368809 A1 | 12/2017 | Sakellarides | |

FOREIGN PATENT DOCUMENTS

| | | | | |
|---|---|---|---|---|
| EP | 1188781 A1 | 3/2002 | | |
| EP | 1489139 A1 * | 12/2004 | | B32B 15/08 |
| EP | 1489139 A1 | 12/2004 | | |
| JP | 62-111734 A | 5/1987 | | |
| JP | 7-268189 A | 10/1995 | | |
| JP | 2002321277 A | 11/2002 | | |
| JP | 2005131859 A * | 5/2005 | | |
| JP | 2005131859 A | 5/2005 | | |

(56) References Cited

FOREIGN PATENT DOCUMENTS

| JP | 2006305866 A | * | 11/2006 |
|----|---|---|---|
| JP | 2006305866 A | | 11/2006 |
| KR | 20060125049 A | | 12/2006 |
| WO | WO 89/08558 A1 | | 9/1989 |
| WO | WO 2004/016417 A2 | | 2/2004 |

OTHER PUBLICATIONS

Hytrel Product Reference Guide.*
International Search Report for International Application No. PCT/US2009/067882, dated May 4, 2010 (5 pages).
"DuPont Hytrel Thermoplastic Polyester Elastomer Product Reference Guide"; Reference No. HYE-A11192-00-B0915; publication date unknown (4 pages).
International Search Report for International Application No. PCT/US2017/038586, dated Sep. 22, 2017 (4 pages).
International Search Report for International Application No. PCT/US2017/038558, dated Sep. 22, 2017 (5 pages).

* cited by examiner

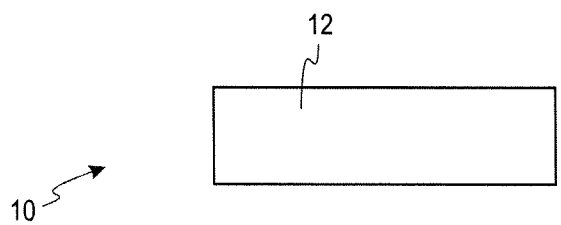
Fig. 1
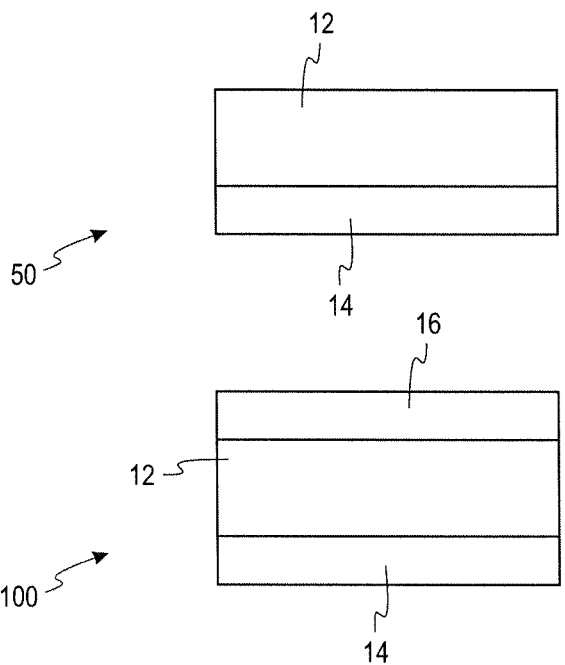
Fig. 2
Fig. 3
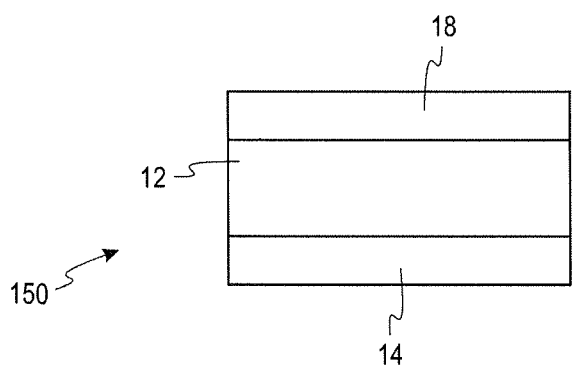
Fig. 4
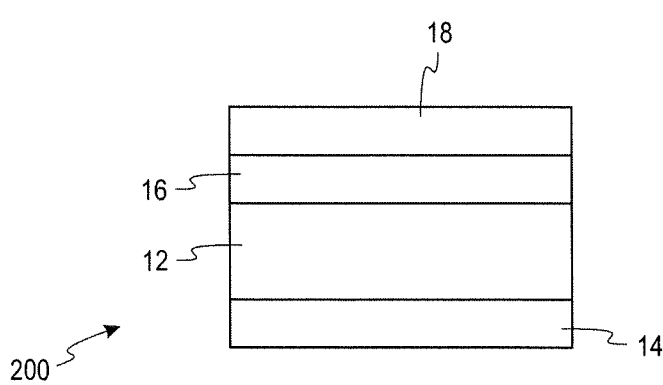
Fig. 5

METHOD OF FORMING A FORMABLE POLYESTER FILM

CROSS-REFERENCE TO RELATED APPLICATION(S)

This invention is a continuation of U.S. patent application Ser. No. 15/336,249 filed Oct. 27, 2016, entitled "Formable Polyester Films" and claims priority to U.S. Provisional Patent Application No. 62/355,695 filed Jun. 28, 2016, which are hereby incorporated by reference herein in their entireties.

FIELD OF INVENTION

The present invention relates generally to formable biaxially-oriented films. More specifically, the present invention is directed to biaxially-oriented films that include crystalline polyester (e.g., crystalline polyethylene terephthalate (PET)) and has a lower resistance to stretching and a softer feel.

BACKGROUND OF INVENTION

Films have been used in fresh meat products packaged at the source (i.e., the meat-processing plant instead of the grocery store). These products include, but are not limited to, pork or beef tenderloins, imported racks of lamb, processed meats (e.g., ham, smoked turkey parts, and sliced processed meats ("cold cuts")), cheese, and sausage products. Many of these products are packaged in thermoformed fill-seal equipment that requires good draw properties for the forming web. These type of films need to have a higher degree of formability, while in certain applications also need to have a high moisture barrier (low water vapor permeability).

Decorated balloons formed from film laminates comprising a polyester film layer (commonly referred to as "Mylar balloons") have been gaining increasing popularity versus conventional latex balloons in view of their ability to be printed with vivid, colorful images, and more versatile and attractive appearances. For example, Mylar balloons can be formed, for example, into Valentine's Day heart shapes, flower shapes, and animal shapes. These shapes may also include printing (e.g., famous characters) thereon.

However, one drawback that limits commercial acceptance of Mylar balloons is they are not capable of being blown into intricate shapes, such as comic-book characters or famous character silhouettes. Rather, the Mylar balloons are limited to simpler shapes such as spheres, circles, shapes, hearts, and stars.

Accordingly, a need exists in flexible packaging for polyester films that have a higher degree of formability, while exhibiting a high moisture barrier. There is also a need for formable balloons that have a desirable performance (e.g., extended floating time).

SUMMARY OF THE INVENTION

According to one embodiment, a formable biaxially-oriented film comprises a first layer. The first layer comprises from about 10 to about 90 wt. % crystalline polyester and from about 10 to about 90 wt. % of a formability enhancer to assist in increasing the polymeric chain flexibility. The formability enhancer has a melting point less than about 230° C. The film has a MD and a TD Young's Modulus of at least 10% lower than a crystalline polyester film in the absence of the formability enhancer.

According to another embodiment, a formable biaxially-oriented film comprises a first layer and a second layer. The first layer comprises from about 10 to about 90 wt. % crystalline polyester and from about 10 to about 90 wt. % of a formability enhancer to assist in increasing the polymeric chain flexibility. The formability enhancer has a melting point less than about 230° C. The second layer comprises an amorphous copolyester. The second layer is adjacent to the first layer. The film has a MD and a TD Young's Modulus of at least 10% lower than a crystalline polyester film in the absence of the formability enhancer.

According to a further embodiment, a formable biaxially-oriented film includes at least one layer. The at least one layer comprises from about 10 to about 90 wt. % crystalline polyester and from about 10 to about 90 wt. % of a formability enhancer to assist in increasing the polymeric chain flexibility. The formability enhancer has a melting point less than about 230° C. The film has a composite MD and TD Young's Modulus of less than about 500 kg/mm$^2$.

The above summary is not intended to represent each embodiment or every aspect of the present invention. Additional features and benefits of the present invention are apparent from the detailed description and figures set forth below.

BRIEF DESCRIPTION OF THE DRAWING

Other advantages of the invention will become apparent upon reading the following detailed description and upon reference to the drawings in which:

FIG. 1 is a generally cross-sectional view of a film according to one embodiment of the present invention.

FIG. 2 is a generally cross-sectional view of a film according to another embodiment of the present invention.

FIG. 3 is a generally cross-sectional view of a film according to a further embodiment of the present invention.

FIG. 4 is a generally cross-sectional view of a film according to yet another embodiment of the present invention.

FIG. 5 is a generally cross-sectional view of a film according to a further embodiment of the present invention.

Figure 6:
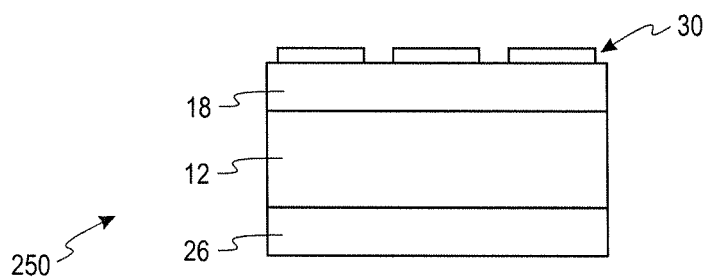
FIG. 6 is a generally cross-sectional view of a film according to another embodiment of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Referring to FIG. 1, a film 10 of the present invention includes a first layer 12. The first layer 12 includes a crystalline polyester and a formability enhancer to assist in increasing the polymeric chain flexibility. The first layer comprises from about 10 to about 90 wt. % crystalline polyester and from about 10 to about 90 wt. % of the formability enhancer.

The crystalline polyester to be used in the first layer 12 includes homopolyesters or copolyesters of polyethylene terephthalate (PET), polyethylene naphthalate (PEN), polyethylene terephthalate-co-isophthalate copolymer, polyethylene terephthalate-co-naphthalate copolymer, polycyclohexylene terephthalate, polyethylene-co-cyclohexylene terephthalate, polyether-ester block copolymer, ethylene glycol or terephthalic acid-based polyester homopolymers and copolymers, or combinations thereof. The polyester desirably used in the first layer includes homopolyesters or copolyesters of polyethylene terephthalate (PET).

Crystallinity is defined as the weight fraction of material producing a crystalline exotherm when measured using a differential scanning calorimeter (DSC). For a high crystalline PET, an exothermic peak in the melt range of about 220 to about 290° C. is most often observed. High crystallinity is defined as the ratio of the heat capacity of material melting in the range of about 220 to about 290° C. versus the total potential heat capacity for the entire material present if it were all to melt. A high crystalline polyester is a polyester that is capable of developing a greater than 35% crystallinity during biaxial orientation.

The crystalline polyester typically includes polyesters with an intrinsic viscosity from about 0.50 to about 1.2 dL/g. The crystalline PET resins typically have intrinsic viscosities from about 0.60 to about 0.85 dL/g, a melting point of from about 255 to about 260° C., a heat of fusion of from about 30 to about 46 J/g, and a density of about 1.4 dL/g.

The formability enhancers used in forming the first layer 12 assist in providing a lower resistance to stretching and a softer feel as compared to a film consisting only of crystalline polyesters. It is desirable for the formability enhancers to transfer their attributes to the first layer 12 to a degree that equals or exceeds the weight average of the properties of the starting polyesters.

Without being bound by theory, the formability enhancers typically include a more flexible segment in their polymer backbone as compared to a crystalline polyester such as crystalline PET. This feature of increased chain flexibility may be characterized by the number of methylene groups in the repeat units of the polymer backbone (e.g., PET has 2 methylene groups; polytrimethylene terephthalate (PPT) has 3 methylene groups; and polybutylene terephthalate (PBT) has 4 methylene groups). Such increased flexibility may also be characterized by generally having a lower melting point than crystalline PET.

Non-limiting examples of materials that may be used as the formability enhancer in the first layer 12 are: (1) Homopolymer or copolymer polyesters of terephthalic acid with diols longer than ethylene glycol (e.g., PTT (polytrimethylene terephthalate) or PBT (polybutylene terephthalate)); (2) copolyester elastomers; (3) polyesters comprising repeating units of at least one aliphatic dicarboxylic acid (e.g., sebacic acid, azelaic acid, adipic acid or combinations thereof); (4) polyesters having more than four methylene groups from aliphatic diols within repeating units (e.g., hexanediol); or (5) combinations thereof.

The polytrimethylene terephthalate (PTT) resins generally have intrinsic viscosities from about 0.9 to about 1.0 dL/g, a melting point of from about 224 to about 227° C., and heat of fusion of from about 40 to about 70 J/g. Non-limiting commercial examples of PTT resins include, but are not limited to, Corterra® (Shell Chemicals Co.), Sorona® (DuPont™ Co.), and Ecoriex® (SK Chemicals Co.).

The polybutylene terephthalate (PBT) resins generally have intrinsic viscosities from about 1.0 to about 1.3 dL/g, a melting point of about 223° C., and a heat of fusion of from about 40 to about 70 J/g. Non-limiting commercial examples of PBT resins include, but are not limited to, Crastin® grades (DuPont™ Co.), Celanex® (Ticona™ division of Celanese Corp.), and Toraycon® (Toray Industries, Inc.).

The copolyester elastomers generally have a melting point of from about 150 to about 220° C. Non-limiting commercial examples of copolyester elastomeric resins include, but are not limited to, Hytrel® grades (DuPont™ Co.) and Arnitel® grades (DSM, Inc.).

Non-limiting example of polyesters comprising repeating units of at least one aliphatic dicarboxylic acid or polyesters having more than four methylene groups from aliphatic diols within repeating units include, but are not limited to, the Vitel® family of resins from Bostik, Inc. and Griltex® family of resins from EMS-Griltech division of EMS-Chemie Holding AG.

The first layer 12 may include additives. Non-limiting examples of desirable additives to be used in the first layer are antiblock and slip additives. Antiblock and skip additives are typically solid particles dispersed within a layer to effectively produce a low coefficient of friction on the exposed surface. This low coefficient of friction assists the film to move smoothly through the film formation, stretching and wind-up operations. In the absence of antiblock and slip additives, outer surfaces are likely more tacky and increase the likelihood of the film being fabricated to stick to itself or to the processing equipment, which can cause excessive production waste and/or low productivity.

Examples of antiblock and slip additives that may be used include, but are not limited to, amorphous silica particles with mean particle size diameters in the range of from about 0.05 to about 0.1 µm at concentrations of from about 0.1 to about 0.4 mass-percent. For example, calcium carbonate particles or precipitated alumina particles may be used as an antiblock and slip additive. Calcium carbonate particles typically have a medium particle size of from about 0.3 to about 1.2 µm at concentrations of about 0.03 to about 0.2 mass-percent. Precipitated alumina particles of sub-micron sizes generally have an average particle size of about 0.1 µm and a mass-percent of from about 0.1 to about 0.4.

Additional non-limiting examples of antiblock and slip additives that may be used include inorganic particles, aluminum oxide, magnesium oxide, titanium oxide, complex oxides (e.g., kaolin, talc, and montmorillonite), barium carbonate, sulfates (e.g., calcium sulfate and barium sulfate), titanates (e.g., barium titanate and potassium titanate), and phosphates (e.g., tribasic calcium phosphate, dibasic calcium phosphate, and monobasic calcium phosphate).

Blends of antiblock and slip additives may be used to achieve a specific objective. For example, it is contemplated that organic particles, vinyl materials (e.g., polystyrene, crosslinked polystyrene, crosslinked styrene-acrylic polymers, crosslinked acrylic polymers, and crosslinked styrene-methacrylic polymers), crosslinked methacrylic polymers, benzoguanamine formaldehyde, silicone, and polytetrafluoroethylene may be used as an antiblock or slip additive.

The antiblock or slip additives may be included in the first layer as a masterbatch addition in one embodiment. For example, the first layer 12 may be formed by extruding a pellet-to-pellet mix (i.e., dry blend) of crystalline polyester, the formability enhancer, and a polyester masterbatch with the antiblock and slip additives.

The first layer 12 may further include a conductive metal compound. Non-limiting examples of conductive metal compounds that may be added are calcium, manganese, magnesium, or combinations thereof. The conductive metal compounds are typically from about 50 to about 100 ppm of the first layer 12. The conductive metal compound may be added during the polymerization process as a catalyst or additive, or in the process as a masterbatch to secure sufficient conductivity for electric pinning in the film-making process.

One non-limiting example of a calcium compound that may be used is calcium acetate. Non-limiting examples of manganese compounds that may be used include manganese chloride, manganese bromide, manganese nitrate, manganese carbonate, manganese acetylacetonate, manganese acetate tetrahydrate, and manganese acetate dihydrate. Non-limiting examples of magnesium compounds that may be used include magnesium chlorides and carboxylates. Magnesium acetate is a particularly desirable compound.

Additional additives may be added to the first layer to assist in suppressing coloring (yellowness) thereof. For example, a phosphorous-based compound may be added to the first layer 12 to assist in suppressing the coloring. Phosphorous-based compounds are typically greater than about 30 ppm so as to sufficiently reduce the undesirable coloring of the film. The phosphorous-based compounds are typically less than about 100 ppm to assist in avoiding haziness in the film.

Phosphorus-based compounds that may be used include, but are not limited to, phosphoric acid-based compounds, phosphorous acid-based compounds, phosphonic acid-based compounds, phosphinic acid-based compounds, phosphine oxide-based compounds, phosphonous acid-based compounds, and phosphonous acid-based compounds. In addition to suppressing the color, it is desirable for the phosphorus-based compound to have thermal stability and suppress debris. Phosphoric acid-based and phosphonic acid-based compounds are particularly desirable.

The first layer 12 generally has a thickness after biaxial orientation of from about 3 to about 25 µm. More specifically, the thickness of the first layer 12 in one embodiment is from about 5 to about 20 µm, or from about 8 to about 15 µm.

Referring to FIG. 2, a film 50 includes the first layer 12 and a second layer 14. The first layer 12 includes a crystalline polyester and a formability enhancer as discussed above. The second layer 14 includes an amorphous copolyester. The amorphous copolyester used in the second layer 14 may include isophthalate modified copolyesters, sebacic acid modified copolyesters, diethyleneglycol modified copolyesters, triethyleneglycol modified copolyesters, cyclohexanedimethanol modified copolyesters, and combinations thereof.

The second layer 14 is adjacent to the first layer 12 in the film 50. More specifically, the second layer 14 is attached to the first layer 12. If attached, the second layer may be co-extruded to the first layer in forming the film. It is contemplated that the second layer may be attached to the first layer by other methods.

The second layer 14 generally has a thickness after biaxial orientation of from about 0.1 to about 10 µm. More specifically, the thickness of the second layer 14 in one embodiment is from about 0.2 to about 5 µm, or from about 0.5 to about 2 µm.

Referring to FIG. 3, a film 100 is shown that includes the first layer 12, the second layer 14 and a third layer 16. The third layer 16 may be formed of the same materials discussed above in conjunction with the second layer 14. The first layer 12 is located between the second layer 14 and the third layer 16. The first, second and third layers may be co-extruded with each other to form the film. It is also contemplated that additional layers may be located between the first layer 12, the second layer 14 and the third layer 16 in either symmetric or asymmetric structures.

The second layer 14 and the third layer 16 may also include antiblock and slip additives. The antiblock and slip additive to be used in the second layer 14 and the third layer 16 may be the same as described above with respect to antiblock and slip additives that may be used in the first layer 12. In this embodiment, it is desirable for the antiblock and slip additives, if added, to be included in the second layer 14 and/or the third layer 16.

The third layer 16 generally has a thickness after biaxial orientation of from about 0.1 to about 10 µm. More specifically, the thickness of the third layer 16 in one embodiment is from about 0.2 to about 5 µm, or from about 0.5 to about 2.0 µm.

Referring to FIG. 4, a film 150 includes the first layer 12, the second layer 14 and a third or barrier layer 18. The first layer 12 is located between the second layer 14 and the third layer 18. The third layer 18 is a barrier layer that is typically a metallic barrier layer.

The barrier layer 18 may include materials such as titanium, vanadium, chromium, manganese, iron, cobalt, nickel, copper, zinc, aluminum, gold, palladium, or combinations thereof for forming the metallic barrier layer. One desirable material for the third layer is aluminum.

It is contemplated that metal oxides may be used in forming the barrier layer 18. One non-limiting example of a metal oxide that may be used in the third layer is an aluminum oxide for forming the metallic barrier layer. It is also contemplated that other metallic materials may be used in forming the metallic barrier layer. It also contemplated that silicone oxide may be used in forming a barrier layer (third layer).

The barrier layer 18 generally has a thickness of from about 5 to about 100 nm. More specifically, the barrier layer 18 in one embodiment is from about 20 to about 80 nm, and even more specifically from about 30 to about 60 nm. The optical density of the barrier layer 18 is generally from about 1.5 to about 5. More specifically, the optical density of the barrier layer 18 in one embodiment is from about 2 to about 4, and more desirably from about 2.3 to about 3.2.

The barrier layer 18 assists in providing a gas and water barrier in the film 150. It is desirable for the barrier layer 18 to have an oxygen transmission rate at 23° C. and 0% RH of from about 5 to about 50 cc/m$^2$/day. It is desirable for the barrier layer 18 to have an oxygen transmission rate at 23° C. and 0% RH of less than about 31 cc/m$^2$/day. It is desirable for the barrier layer to have a water vapor transmission at 38° C. and 90% RH of from about 0.03 to about 0.70 g/m$^2$/day and more desirably less than 0.31 g/m$^2$/day.

In one process, the barrier layer 18 is deposited onto the first layer 12 using vacuum deposition. It is contemplated that the barrier layer 18 may be placed onto the first layer 12 by other methods.

Before the barrier layer 18 is formed or placed onto the first layer 12, the first layer 12 is desirably plasma treated to clean and functionalize the outer surface thereof. The utilization of the plasma treatment produces very high metal adhesion and it is believed to increase the surface energy of the resultant metal surface.

In addition to plasma-treatment processing, it is contemplated that other surface treatment methods may be employed in a vacuum system. For example, methods such as copper seeding, nickel seeding or other sputtering treatment methodologies may be used. The metal vapor may then be deposited on the outer surface of the first layer 12 by high-speed, vapor-deposition metallizing processes well known in the art to form the third layer 18.

In a further embodiment, a film 200 includes the first layer 12, the second layer 14, the third layer 16 and the barrier layer 18. The first layer 12 is located between the second layer 14 and the third layer 16. The third layer 16 is located between the first layer 12 and the barrier layer 18.

The films of the present invention may be coated or treated on one or both sides of the film for adhesion promotion, surface conductivity, higher wetting tension, or combinations thereof. Preferred treatments include methods such as corona treatment, plasma treatment, flame treatment, corona treatment in a controlled atmosphere of gases, and in-line coating methods.

The films of the present invention are biaxially stretched to obtain the desired crystallinity, thickness, gas barrier, and mechanical properties. Biaxially stretching typically includes stretching a polymer sheet along the machine direction (MD) on a set of rolls rotating at progressively higher speeds and stretching the sheet along the transverse direction (TD) by increasing the film width using traveling clips in a stenter oven.

The MD and TD stretching of the film may be performed either sequentially or simultaneously. For example, the MD and TD stretching may be performed by: (1) first longitudinally (MD) and then transversely (TD); (2) first transversely and then longitudinally; (3) longitudinally, transversely, and again longitudinally and/or transversely; or (4) simultaneously in both the longitudinal and transverse directions. The biaxially stretching is typically performed by longitudinally stretching and then transversely stretching.

The films of the present invention have a lower resistance to stretching and a softer feel as compared to standard polyester films. The films of the present invention modify the stress-strain curve manifested by reduction in modulus and yield strength. The films of the present invention desirably combines the softness, formability (manifested by reduced initial modulus and yield strength) and puncture resistance of nylons with the high moisture vapor and oxygen gas-barrier properties, and dimensional stabilities of polyesters.

In one embodiment, the films of the present invention have a MD Young's Modulus of at least 10% lower than a crystalline polyester film in the absence of the formability enhancer. The films of the present invention desirably have a MD Young's Modulus of at least 20 or 30% lower than a crystalline polyester film in the absence of the formability enhancer. The films of the present invention desirably have a MD Young's Modulus of at least 40 or 50% lower than a crystalline polyester film in the absence of the formability enhancer.

In one embodiment, the films of the present invention have a TD Young's Modulus of at least 10% lower than a crystalline polyester film in the absence of the formability enhancer. The films of the present invention desirably have a TD Young's Modulus of at least 20 or 30% lower than a crystalline polyester film in the absence of the formability enhancer. The films of the present invention desirably have a TD Young's Modulus of at least 40 or 50% lower than a crystalline polyester film in the absence of the formability enhancer.

In a further embodiment, the films of the present invention have both a MD and a TD Young's Modulus of at least 10% lower than a crystalline polyester film in the absence of the formability enhancer. The films of the present invention desirably have both a MD and a TD Young's Modulus of at least 20 or 30% lower than a crystalline polyester film in the absence of the formability enhancer. The films of the present invention desirably have both a MD and a TD Young's Modulus of at least 40 or 50% lower than a crystalline polyester film in the absence of the formability enhancer.

In another embodiment, the films of the present invention have a composite MD and TD Young's Modulus of less than about 500 kg/mm$^2$ as measured by ASTM D 882. The films of the present invention desirably have a composite MD and TD Young's Modulus of less than about 475 or about 450 kg/mm$^2$ as measured by ASTM D 882. The films of the present invention more desirably have a composite MD and TD Young's Modulus of less than about 400 kg/mm$^2$ as measured by ASTM D 882.

In one embodiment, the first layer comprises from about 10 to about 90 wt. % crystalline polyester and from about 10 to about 90 wt. % of the formability enhancer. In another embodiment, the first layer comprises from about 20 to about 80 wt. % crystalline polyester and from about 20 to about 80 wt. % of the formability enhancer. In a further embodiment, the first layer comprises from about 30 to about 70 wt. % crystalline polyester and from about 30 to about 70 wt. % of the formability enhancer. In another embodiment, the first layer comprises from about 40 to about 60 wt. % crystalline polyester and from about 40 to about 60 wt. % of the formability enhancer.

The films of the present invention may be used in applications such as flexible packaging, in-mold and other labels, and industrial uses. The films may also be used in balloon applications. It is contemplated that the films of the present invention may be used in other applications.

The films of the present invention typically are from about 2 to about 350 μm in thickness after biaxial orientation. The films are generally from about 3 to about 50 μm and, more specifically, from about 10 to about 25 μm, and even more specifically from about 12 to about 23 μm in thickness after biaxial orientation.

The thickness of film 100 in balloon applications is generally from about from about 4 to about 12 μm and, more specifically, from about 5 to about 10 μm after biaxial orientation.

In one process, the films of the present invention are formed by an extrusion process. The extrusion process includes drying the masterbatch and crystallizable polyester (e.g., PET) particles to desirably reach a moisture content of less than 100 ppm. The dried resins are fed to a melt processor such as a mixing extruder. The molten material, including any additives, is extruded through a slot die at about 285° C., quenched and electrostatically-pinned onto a chill roll (e.g., a chill roll having a temperature about 20° C.), in the form of a substantively amorphous cast film. The cast film may then be reheated and stretched.

The stretching temperatures are generally above the glass transition temperature of the film polymer by about 10 to about 60° C. Typical MD processing temperature is about 95° C. The longitudinal (MD) stretching ratio is generally from about 2 to about 6, and more desirably from about 3 to about 4.5. The transverse stretching ratio is generally from about 2 to about 5, and more desirably from about 3 to about 4.5. Typical TD processing temperature is about 110° C. If a second longitudinal or transverse stretching is used, the ratios are generally from about 1.1 to about 5. Heat-setting of the film may follow at an oven temperature of from about 180 to about 260° C., desirably from about 220 to about 250° C. with a 5% relaxation to produce a thermally dimensionally stable film with minimal shrinkage. The film may then be cooled and wound up into roll form.

Referring to FIG. 6, a film 250 includes the first layer 12, the barrier layer 18 and a sealant layer 26. The first layer 12 is located between the barrier layer 18 and the sealant layer 26. The film 250 further includes printing 30 (e.g., a graphic design) adjacent to the barrier layer 18. The printing may be performed with a flexographic-printing press that prints a variety of colors. After print application, the inks are typically dried in a roller convective oven to remove solvents from the ink. One non-limiting structure that may be formed from the film 250 is a balloon. It is contemplated that the film 250 may be used in other applications.

The sealant layer 26 assists in providing sealing to a structure formed by the film. In one embodiment, the sealant layer 26 is a low-melt polyolefin layer. The polyolefin layer may be a low density polyethylene (LLDPE), a low density polyethylene (LDPE), or combinations thereof.

Figure 7:
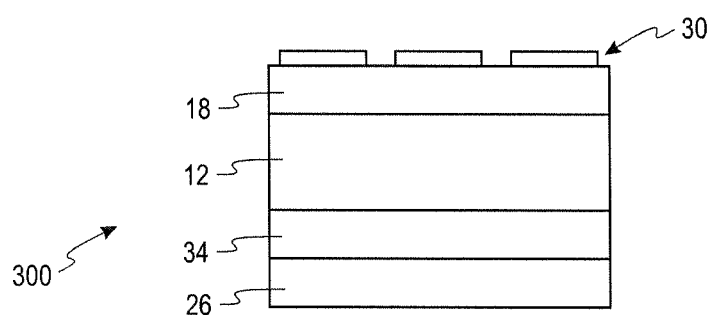
FIG. 7 is a generally cross-sectional view of a film according to another embodiment of the present invention.

To facilitate bonding of the sealant layer 26 to the second layer 14, an anchor layer or primer 34 may be used. This is shown, for example, in a film 300 of FIG. 7. The film 300 includes the first layer 12, the barrier layer 18, the sealant layer 26 and the anchor layer 34.

One non-limiting example of an anchor layer 34 is a water-based primer. Water-based primers enhance raw material post-reclaiming by allowing the ability to wash away the primer in an aqueous wash bath. This can assist in delamination of the other layers from the sealant layer 26 and facilitate segregation into separate polyester and polyethylene recycle streams. The sealant layer 26 may be extrusion-coated to the anchor layer 34.

The anchor layer 34 may be selected from, but is not limited to, a polyethylene dispersion. One non-limiting example of a material that may form the anchor layer is polyethylenimine. The anchor layer 34 may be applied in a water dispersion or another solvent, using an application method such as gravure coating, Meyer rod coating, slot die, knife-over-roll, or other variation of solution coatings.

The applied dispersion may then be dried with hot air, leaving the anchor layer 34 having a dried thickness of from about 0.01 to about 0.1 µm. The first layer 12 may be treated prior to applying the anchor layer 34. The treatment increases the surface energy of the first layer 12 to increase wetting of the dispersion and bond strength of the dried anchor layer 34. Some non-limiting treatment methods include, but are not limited to, corona, gas modified corona, atmospheric plasma, and flame treatment.

Figure 8:
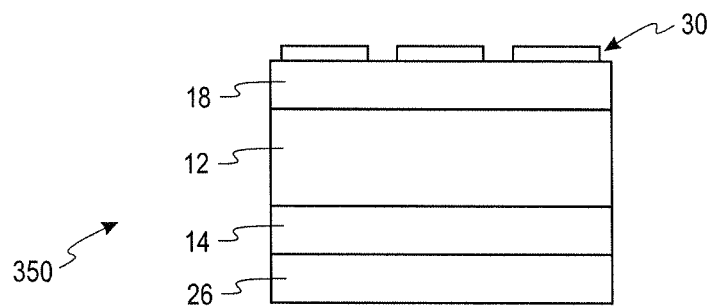
FIG. 8 is a generally cross-sectional view of a film according to another embodiment of the present invention.

Referring to FIG. 8, a film 350 includes the first layer 12, the second layer 14, the barrier layer 18 and the sealant layer 26. The first layer 12 is located between the third layer 18 and the second layer 14. The second layer 14 is located between the first layer 12 and the sealant layer 26. The film 350 further includes printing 30 (e.g., a graphic design) adjacent to the barrier layer 18.

Figure 9:
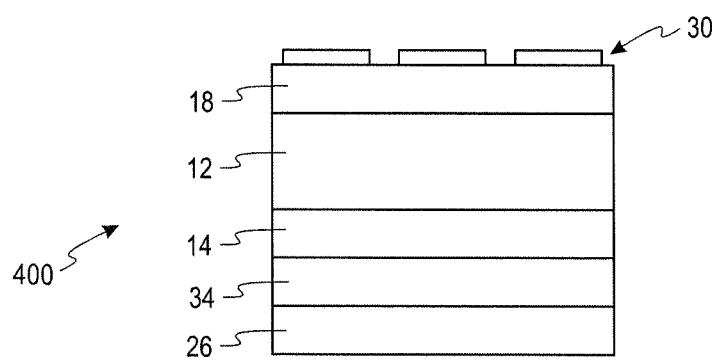
FIG. 9 is a generally cross-sectional view of a film according to another embodiment of the present invention.

Referring to FIG. 9, a film 400 includes the first layer 12, the second layer 14, the barrier layer 18, the sealant layer 26 and the anchor layer 34. The first layer 12 is located between the barrier layer 18 and the second layer 14. The second layer 14 is located between the first layer 12 and the anchor layer 34. The anchor layer 34 assists in attaching the second layer 14 and the sealant layer 26. The second layer 14 may be treated prior to applying the anchor layer 34. The treatment increases the surface energy of the second layer 14 to increase wetting of the dispersion and bond strength of the dried anchor layer 34. Some non-limiting treatment methods include, but are not limited to, corona, gas modified corona, atmospheric plasma, and flame treatment. The film 400 further includes printing 30 (e.g., a graphic design) adjacent to the barrier layer 18.

Figure 10:
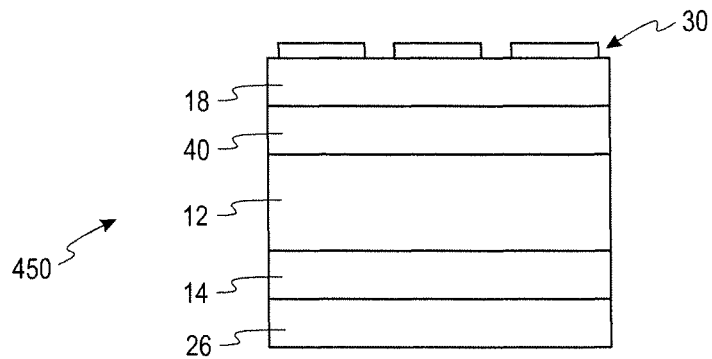
FIG. 10 is a generally cross-sectional view of a film according to another embodiment of the present invention.

Referring to FIG. 10, a film 450 is shown that includes the first layer 12, the second layer 14, the barrier layer 18, the sealant layer 26 and a polymeric gas-barrier layer 40. The film 450 further includes printing 30 (e.g., a graphic design) adjacent to the third layer 18. The film 450 is especially desirable for forming a balloon. It is contemplated that the film 450 may be used in other applications.

The polymeric gas-barrier layer 40 may be made of materials such as, for example, ethylene-vinyl alcohol (EVOH), polyvinyl alcohol (PVOH), polyvinyl amine, and combinations thereof. It is contemplated that other materials may be used in forming the polymeric gas-barrier layer.

In addition, a proper cross-linker may be added to reinforce the polymeric gas-barrier layer. Non-limiting examples of cross-linkers include melamine-based cross-linkers, epoxy-based cross-linkers, glyoxal-based cross-linkers, aziridine-based cross-linkers, epoxyamide compounds, titanate-based coupling agents, (e.g., titanium chelate), oxazoline-based cross-linkers, isocyanate-based cross-linkers, methylolurea or alkylolurea-based cross-linkers, aldehyde-based cross-linkers, acrylamide-based cross-linkers, and combinations thereof.

The polymeric gas-barrier layer may be applied in a dispersion or solution in water or another solvent, using an application method such as gravure coating, Meyer rod coating, slot die, knife over roll, or any variation of solution coating known in the art. The applied dispersion or solution may then be dried with hot air. The coating-receiving surface may be treated prior to applying the polymeric gas-barrier layer.

The combination of the barrier layer 18 (e.g., a metallic barrier layer) and the polymeric gas barrier layer creates a very high gas barrier property that can further improve the life time (or float time) of a balloon. In addition to improving the gas-barrier characteristics of the film, the polymeric gas-barrier layer applied to the surface of the barrier layer 18 can also prevent damage or removal of the barrier layer 18 during the severe processes of balloon fabrication and during handling by the end consumer. The polymeric gas-barrier layer 40 may be softer than the barrier layer 18 and is able to maintain a good barrier as the secondary barrier layer after possessing and handling.

It is contemplated that the polymeric gas-barrier layer may be placed in a different location within the film than that depicted in FIG. 10.

Figure 11:
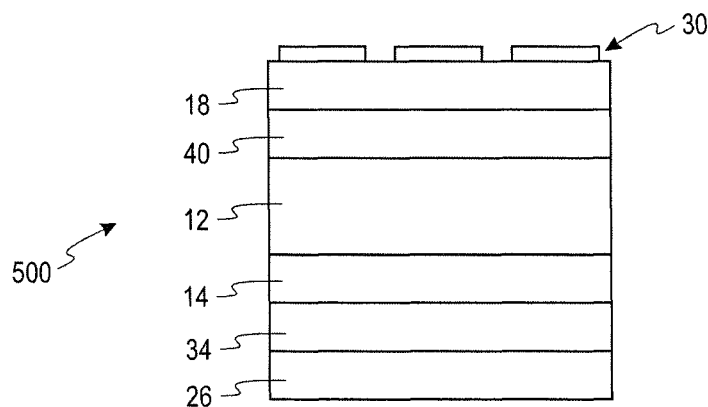
FIG. 11 is a generally cross-sectional view of a film according to yet another embodiment of the present invention.

It is also contemplated that the film of FIG. 10 may further include the anchor layer 34. This is shown, for example, in FIG. 11 with film 500. In this embodiment, the anchor layer 34 is located between the second layer 14 and the sealant layer 26.

Once the laminations are prepared, the following process may be used to fabricate the film into balloons: (1) flexographic printing of graphic designs on the opposite surface of the sealant; (2) slitting of the subsequent printed web; (3) fabrication of balloons by die-cutting and heat sealing process; and (4) folding and packaging of the finished balloons.

Flexographic printing is well known in the art and may be used to print graphic designs on the balloons. The printing equipment used in this process may be set up in a manner that will prevent scratching, scuffing or abrading the gas-barrier surface. The opposite side of the sealant layer of the laminate may be printed on the metal surface with up to 10 colors of ink using a flexographic printing press. Each color receives some drying prior to application of the subsequent color. After printing, the inks may be fully dried in a roller convective oven to remove all solvents from the ink.

Slitting may be accomplished in any suitable fashion known in the art. The slitting equipment used in this process is desirably set up in a manner that will prevent scratching, scuffing or abrading the gas barrier surface. In one embodiment, the printed web may be cut to lengths adequate for the balloon-fabrication process by rewinding on a center driven rewinder/slitter using lay-on nip rolls to control air entrapment of the rewound roll.

The printed web may be cut to lengths adequate for a balloon fabrication process by rewinding on a driven rewinder/slitter using lay-on nip rolls to control air entrapment of the rewound roll.

Balloon fabrication may be accomplished in any suitable fashion known in the art. The fabrication equipment used in this process is desirably set up in a manner that will prevent or inhibit scratching, scuffing or abrading the gas-barrier surface. The slit webs may be fabricated into balloons by aligning two or more webs into position so that the printed graphics are properly registered to each other, then are thermally adhered to each other and cut into shapes using known methods. A seam thickness of 1/64" to 1/2" may be used, as this seam thickness has been found to have greater resistance to defects with an optimal seam being 1/16" to 1/8". Optionally, a valve can be inserted into an opening and the layers abutting the valve adhered to form a complete structure.

Folding may be accomplished in any suitable fashion. The folding equipment used in this process is desirably set up in a manner that will prevent scratching, scuffing or abrading the gas barrier surface. The fabricated balloons may be mechanically folded along multiple axes using a mechanical process or by hand. The balloon can be folded to the proper size and then loaded into a pouch or box for downstream sales.

The balloons typically use gases that are lighter than area including helium. It is contemplating that other gases may be used.

The balloons generally have an oxygen transmission rate less than about 150 cc/m$^2$/day. The balloons typically have an oxygen transmission rate less than about 50 or even less than about 30 cc/m$^2$/day. The balloons typically have a floating time greater than 20 days.

EXAMPLES

Examples 1-27 further define various aspects of the present disclosure. These Examples are intended to be illustrative only and are not intended to limit the scope of the present disclosure. Also, parts and percentages are by weight unless otherwise indicated. The inventive formulations of the films are shown in Table 1 below and comprise blends of a polyester (crystalline polyethylene terephthalate (PET)) and a formability enhancer.

The film preparations of Comparative Examples 1-5 and Examples 1-26 were conducted on a pilot extrusion/biaxial stretching film line utilizing a 20" wide die and a final line speed of about 100 feet/min. The film preparations described in Comparative Example 6 and Example 27 were conducted on a commercial extrusion/biaxial stretching film line utilizing a 75" wide die and a final line speed of about 800 and about 500 feet/min., respectively, for Comparative Example 6 and Example 27.

Resin materials for films used in the examples were as follows:

PET resin ("PET-1"): film-grade crystalline PET resin F21MP (IV=0.65 dL/g; Tm=255° C.) manufactured by Toray Plastics (America), Inc.

PET resin ("PET-2"): crystalline PET resin (IV=0.62 dL/g; Tm=255° C.) antiblock masterbatch type F18M, containing 2% silica particles with an average size of 2 μm (Fuji Silysia® 310P) manufactured by Toray Plastics (America), Inc.

PETG copolyester resin masterbatch ("PETG-m/b"): PETG amorphous copolyester Eastar™ 6763 (made by Eastman Chemical Co.) as the carrier resin. PETG-m/b is an antiblock masterbatch based on 90 wt. % PETG resin 6763 and 10 wt. % of silica particles. PETG 6763 is an amorphous copolyester of terephthalic acid with a diol mixture consisting of about 33 mole % of 1,4-cyclohexane dimethanol and about 67 mole % of ethylene glycol.

Essentially amorphous copolyester resin ("IPET"): F55M resin (IV=0.69 dL/g; Tm=205° C.) manufactured by Toray Plastics (America), Inc. based on 19:81 molar (=weight in this case) parts combination of isophthalic/terephthalic acid reacted with ethylene glycol Block copolyester elastomer resin: Hytrel® 7246 from DuPont™ Co., comprised 72% hard segment and 28% soft segment, characterized by a melting point of 218° C. and a melt flow rate of 12.5.

Polybutylene terephthalate resin ("PBT"): Crastin® FG6130 (made by DuPont™ Co.), characterized by an IV of 1.0 dL/g and a melting point of 223° C.

Polytrimethyelene terephthalate resin ("PTT"): Ecoriex® from SK Chemical Co., characterized by an IV of 0.99 dL/g and a melting point of 227° C.

Polyesters comprising aliphatic moieties originating from long aliphatic diacids or diols: Griltex D 1939E GF from EMS-Griltech characterized by a melting point of 150° C. ("Griltex 1939").

Testing Methods

The various properties in the above examples were measured by the following methods:

Intrinsic viscosities (IV) of the film and resin were tested according to ASTM D 460. This test method is for the IV determination of polyethylene terephthalate (PET) soluble at 0.50% concentration in a 60/40 phenol/1,1,2,2-tetrachloroethane solution by means of a glass capillary viscometer.

Melting point of polyester resin was measured using a TA Instruments Differential Scanning calorimeter model 2920. A 0.007 g resin sample was tested according to ASTM D3418-03. The preliminary thermal cycle was not used, consistent with Note 6 of the ASTM standard. The sample was then heated up to 280° C. temperature at a rate of 10° C./min., then cooled back to room temperature. Then, the heat flow and temperature data was recorded. The melting point was reported as the temperature at the endothermic peak located in the temperature range between about 150 and about 280° C.

Film tensile properties (e.g., Young's Modulus) were measured according to ASTM method D882, using a Tensilon™ tensile tester (made by A&D Company, Ltd.), at a test speed of 20 cm/min. and initial jaw separation of 10 cm. The composite modulus is the arithmetic mean of Young's Modulus along the machine direction (MD) and the transverse direction (TD).

Metal optical density (OD) was measured using a GretagMacbeth GmbH model D200-II measurement device. The densitometer was zeroed by taking a measurement without a sample. Then, the optical density of the metallized polyester film layer was measured every 3" across the web and the average was reported as the metal OD. Optical density is defined as the amount of light reflected from the test specimen under specific conditions. Optical density was reported in terms of a logarithmic conversion. For example, a density of 0.00 indicates that 100% of the light falling on the sample is being reflected. A density of 1.00 indicates that 10% of the light is being reflected; 2.00 is equivalent to 1% of the light being reflected, etc.

Wetting tension of the surfaces of interest was measured substantially in accordance with ASTM D2578-67.

Oxygen barrier was measured on a MOCON Ox-Tran® L series device utilizing ASTM D3985. Testing conditions used were 73° F., 0% relative humidity, and 1 atm. In this measurement, the gas-barrier surface of the web was hand-laminated using a rubber roller to a 1-mil (about 25 μm) thick LDPE blown film tape with a pressure-sensitive adhesive. The lamination protected the gas-barrier surface from handling damage, but made no significant contribution to the oxygen-barrier properties.

Metal adhesion, dry-bonding strength was measured by heat-sealing of a Dow Chemical Co. PRIMACOR® 3300 ethylene acrylic acid (EAA) cast film to the metal surface on a Testing Machines, Inc. Sentinel® model 12 ASL heat sealer in a room that was air-conditioned as 73±4° F. and 50±5% RH. On the back side of the film, an adhesive tape (3M Corp. grade Scotch® 610) was applied to keep the film from breaking during the test. The heat seal conditions were 220° F. temperature, a 20 seconds dwell time, a 40 psi jaw pressure, and one heated and one unheated jaw. Prior to peel testing, the sealed materials were cut so that each web could be gripped in a separate jaw of the tensile tester and a 1"×1" section of sealed material can be peeled. The peel was initiated by hand and then the two webs were peeled apart on an Instron® tensile tester in a 180° configuration toward the PRIMACOR® film. If the metal separated from the substrate and remained attached to the PRIMACOR® film, then the mean force of the peel was reported as the metal bond strength.

Wet bonding strength of the metal layer was measured by the same procedure as dry bonding strength, with the exception that a cotton swab soaked with water was used to apply water to the interface of the sealed area during peeling.

Sealing strength of the film or balloon structure was measured as following. The seal layer was sealed to itself using a Pack Rite® heat sealer with 15"×⅜" jaw. The heat seal conditions were 405° F. temperature, 2 seconds dwell time, 90 psi jaw pressure, and one heated and one unheated jaw. Prior to peeling, the sealed materials were cut so that each web could be gripped in a separate jaw of the tensile tester and 1'×⅜" section of sealed material could be peeled. The two webs were pealed apart on an Instron® tensile tester in a 90° configuration known as a T-peel. The peel was initiated at a speed of 2 in./min. until 0.5 lbs. of resistance was measured to preload the sample. Then, the peel was continued at a speed of 6 in./min. until the load dropped by 20%, which signaled failure. The maximum recorded load prior to failure was reported as the seal strength.

Floating time of the balloon was determined by inflating the balloon with helium gas and measuring the number of days that the balloon remains fully inflated. A balloon was filled from a helium source using a pressure-regulated nozzle designed for "foil" balloons, such as the Conwin Carbonic Co. Precision Plus™ balloon inflation regulator and nozzle. The pressure was regulated to 16 inches of water column. The balloon was filled with helium in ambient conditions of about 20° C. temperature and 1 atmosphere barometric pressure. The balloon was secured using adhesive tape on the outside of the balloon below the balloon's valve access hole to avoid creating any slow leaks of helium gas through the valve. During the testing, the balloon was kept in a stable environment close to the above-stated ambient conditions.

Changes in temperature and barometric pressure were recorded to interpret float time results since major fluctuations can invalidate the test. The balloon was judged to be no longer fully inflated when the appearance of the balloon changed such that: (1) the wrinkles running through the heat seal seam area became deeper and longer, extending into the front face of the balloon; and (2) the cross-section of seam became a V-shape, as opposed to the rounded shape that characterizes a fully inflated balloon. At this time the balloon will still physically float, but will no longer have an aesthetically-pleasing appearance. The number of days between initial inflation and the loss of aesthetic appearance described above was reported as the floating time of the balloon.

COMPARATIVE EXAMPLES ("COMP.")

A 48 gauge (12 μm) monolayer polyester film was prepared by extruding a 97:3 blend of resins PET-1 and PET-2 (i.e., in the absence of a formability enhancer). The extruded melt curtain was cast on a cooling drum held at 70° F. and subsequently stretched longitudinally at 180° F. at draw ratio 3.0, and then transversely at 190° F. at draw ratio 3.75 and heat-set at 400° F. at 3% relaxation.

The results of the Young's Modulus film properties are shown in Table 1 below.

TABLE 1

| Example | Formability Enhancer in Layer 12 | Form. Enhancer (wt. %) | IPET (Layer 14) | Y. Modulus (kg/mm$^2$) MD | TD | Stretch Temp (° F.) MD | TD | 5% Relax. Temp. (° F.) | Stretch Ratio MD | TD |
|---|---|---|---|---|---|---|---|---|---|---|
| | | | | Series 1 | | | | | | |
| Comp. 1 | none | 0 | no | 496 | 548 | 180 | 190 | 400 | 3 | 3.75 |
| 1 | Hytrel ® 7246 | 5 | no | 467 | 447 | 180 | 190 | 400 | 3 | 3.75 |
| 2 | Hytrel ® 7246 | 10 | no | 435 | 524 | 180 | 190 | 400 | 3 | 3.75 |

TABLE 1-continued

| Example | Formability Enhancer in Layer 12 | Form. Enhancer (wt. %) | IPET (Layer 14) | Y. Modulus (kg/mm$^2$) MD | Y. Modulus (kg/mm$^2$) TD | Stretch Temp (° F.) MD | Stretch Temp (° F.) TD | 5% Relax. Temp. (° F.) | Stretch Ratio MD | Stretch Ratio TD |
|---|---|---|---|---|---|---|---|---|---|---|
| | | | | Series 2 | | | | | | |
| Comp. 2 | none | 0 | no | 539 | 580 | 180 | 180 | 400 | 3 | 4 |
| 3 | Hytrel ® 7246 | 15 | no | 426 | 537 | 180 | 180 | 400 | 3 | 4 |
| 4 | Hytrel ® 7246 | 20 | no | 351 | 500 | 160 | 180 | 400 | 3 | 4 |
| 5 | Hytrel ® 7246 | 25 | no | 354 | 512 | 160 | 180 | 400 | 3 | 4 |
| 6 | Hytrel ® 7246 | 30 | no | 324 | 442 | 160 | 180 | 400 | 3 | 4 |
| 7 | Hytrel ® 7246 | 35 | no | 332 | 393 | 160 | 180 | 400 | 3 | 4 |
| | | | | Series 3 | | | | | | |
| Comp. 3 | none | 0 | yes | 512 | 583 | 180 | 180 | 400 | 3 | 4 |
| 8 | Hytrel ® 7246 | 25 | yes | 433 | 503 | 160 | 180 | 400 | 3 | 4 |
| 9 | Hytrel ® 7246 | 30 | yes | 403 | 515 | 160 | 180 | 400 | 3 | 4 |
| 10 | Hytrel ® 7246 | 35 | yes | 299 | 355 | 160 | 180 | 400 | 3 | 4 |
| 11 | Hytrel ® 7246 | 40 | yes | 314 | 403 | 160 | 180 | 375 | 2.8 | 4 |
| 12 | Hytrel ® 7246 | 40 | yes | 369 | 315 | 160 | 180 | 375 | 2.8 | 3.75 |
| 13 | Hytrel ® 7246 | 50 | yes | 285 | 447 | 160 | 180 | 400 | 2.5 | 3.75 |
| | | | | Series 4 | | | | | | |
| Comp. 4 | none | 0 | no | 475 | 597 | 170 | 180 | 400 | 3 | 4 |
| 15 | PTT | 10 | no | 419 | 564 | 175 | 180 | 400 | 3 | 4 |
| 16 | PTT | 25 | no | 410 | 518 | 175 | 180 | 400 | 3 | 4 |
| 17 | PTT | 35 | no | 405 | 420 | 170 | 180 | 340 | 3 | 4 |
| 18 | PTT | 50 | no | 281 | 382 | 160 | 170 | 330 | 3 | 4 |
| 19 | PTT | 99 | no | 230 | 230 | 120 | 110 | 330 | 2.25 | 3 |
| | | | | Series 5 | | | | | | |
| Comp. 5 | none | 0 | no | 473 | 640 | 180 | 180 | 420 | 3 | 4.5 |
| 20 | PBT | 10 | no | 493 | 580 | 180 | 180 | 420 | 3 | 4.5 |
| 21 | PBT | 25 | no | 393 | 551 | 175 | 180 | 400 | 3 | 4.5 |
| 22 | PBT | 50 | no | 322 | 497 | 155 | 180 | 400 | 3 | 4.5 |
| 23 | PBT | 75 | no | 258 | 350 | 150 | 180 | 350 | 3 | 4.5 |
| 24 | PBT | 99 | no | 234 | 267 | 120 | 140 | 300 | 3 | 4.5 |
| | | | | Series 6 | | | | | | |
| 25 | Griltex 1939 | 5 | no | 401 | 509 | 170 | 190 | 400 | 3 | 4 |
| 26 | Griltex 1939 | 10 | no | 409 | 503 | 150 | 180 | 400 | 3 | 3.75 |
| | | | | Series 7 | | | | | | |
| Comp. 6 | none | 0 | yes | 517 | 520 | 255 | 230 | 450 | 4.8 | 3.9 |
| 27 | PBT | 25 | yes | 395 | 438 | 248 | 230 | 400 | 4.4 | 3.9 |

The composite modulus and its % reduction derivations based on date of Table 1 are shown below in Table 1a.

TABLE 1A

| Example | Formability Enhancer in Layer 12 | Formability Enhancer (wt. %) | Presence of IPET (Layer 14) | Stretch Ratio MD | Stretch Ratio TD | Composite Modulus (MD + TD)/2 Kg/mm$^2$ | % Reduction in Composite Modulus vs. Comp. Ex. |
|---|---|---|---|---|---|---|---|
| | | | | Series 1 | | | |
| Comp. 1 | none | 0 | no | 3 | 3.75 | 522 | 0% |
| 1 | Hytrel 7246 | 5 | no | 3 | 3.75 | 457 | 12% |
| 2 | Hytrel 7246 | 10 | no | 3 | 3.75 | 480 | 8% |
| | | | | Series 2 | | | |
| Comp. 2 | none | 0 | no | 3 | 4 | 560 | 0% |
| 3 | Hytrel 7246 | 15 | no | 3 | 4 | 482 | 14% |
| 4 | Hytrel 7246 | 20 | no | 3 | 4 | 426 | 24% |
| 5 | Hytrel 7246 | 25 | no | 3 | 4 | 433 | 23% |
| 6 | Hytrel 7246 | 30 | no | 3 | 4 | 383 | 32% |
| 7 | Hytrel 7246 | 35 | no | 3 | 4 | 363 | 35% |
| | | | | Series 3 | | | |
| Comp. 3 | none | 0 | yes | 3 | 4 | 548 | 0% |
| 8 | Hytrel 7246 | 25 | yes | 3 | 4 | 468 | 15% |
| 9 | Hytrel 7246 | 30 | yes | 3 | 4 | 459 | 16% |

TABLE 1A-continued

| Example | Formability Enhancer in Layer 12 | Formability Enhancer (wt. %) | Presence of IPET (Layer 14) | Stretch Ratio MD | Stretch Ratio TD | Composite Modulus (MD + TD)/2 Kg/mm² | % Reduction in Composite Modulus vs. Comp. Ex. |
|---|---|---|---|---|---|---|---|
| 10 | Hytrel 7246 | 35 | yes | 3 | 4 | 327 | 40% |
| 11 | Hytrel 7246 | 40 | yes | 2.8 | 4 | 359 | 35% |
| 12 | Hytrel 7246 | 40 | yes | 2.8 | 3.75 | 342 | 38% |
| 13 | Hytrel 7246 | 50 | yes | 2.5 | 3.75 | 366 | 33% |
| | | | Series 4 | | | | |
| Comp. 4 | none | 0 | no | 3 | 4 | 536 | 0% |
| 15 | PTT | 10 | no | 3 | 4 | 492 | 8% |
| 16 | PTT | 25 | no | 3 | 4 | 464 | 13% |
| 17 | PTT | 35 | no | 3 | 4 | 413 | 23% |
| 18 | PTT | 50 | no | 3 | 4 | 332 | 38% |
| 19 | PTT | 99 | no | 2.25 | 3 | 230 | 57% |
| | | | Series 5 | | | | |
| Comp. 5 | none | 0 | no | 3 | 4.5 | 557 | 0% |
| 20 | PBT | 10 | no | 3 | 4.5 | 537 | 4% |
| 21 | PBT | 25 | no | 3 | 4.5 | 472 | 15% |
| 22 | PBT | 50 | no | 3 | 4.5 | 410 | 26% |
| 23 | PBT | 75 | no | 3 | 4.5 | 304 | 45% |
| | | | Series 6 | | | | |
| 25 | Griltex 1939 | 5 | no | 3 | 4 | 455 | 17% |
| 26 | Griltex 1939 | 10 | no | 3 | 3.75 | 456 | 17% |
| | | | Series 7 | | | | |
| Comp. 6 | none | 0 | yes | 3 | 4.5 | 410 | 26% |
| 27 | PBT | 25 | yes | 3 | 4.5 | 304 | 45% |

Examples 1-2

Comparative Example 1 was repeated with the exception that Hytrel 7246 resin was added as a blending modifier at 5 and 10 wt. %, respectively, replacing in each case an equal portion of PET-1. The Young's Modulus film properties are shown in Tables 1 and 1A.

Comparative Example 2

A 48 gauge (12 µm) monolayer polyester film was prepared by extruding a 97:3 blend of resins PET-1 and PET-2 (i.e., in the absence of a formability enhancer). The extruded melt curtain was cast on a cooling drum held at 70° F. and subsequently stretched longitudinally at 180° F. at draw ratio 3.0, and then transversely at 180° F. at draw ratio 4.0 and heat-set at 400° F. at 5% relaxation. The Young's Modulus film properties are shown in Tables 1 and 1A.

Examples 3-7

Comparative Example 1 was repeated with the exception that Hytrel 7246 was added as blending modifier at 15, 25, 30, and 35 wt. %, respectively, replacing in each case an equal portion of PET-1. In some cases, stretching temperatures had to be modified as shown in Table 1 to maintain a stable process. The Young's Modulus film properties are shown in Tables 1 and 1A.

Comparative Example 3

A 48 gauge (12 µm) two-layer polyester film was prepared by extruding a 97:3 blend of resins PET-1 and PET-2 through a main extruder, and 100% resin "IPET" through a sub extruder (i.e., in the absence of a formability enhancer). The extruded melt curtain was cast on a cooling drum held at 70° F. and subsequently stretched longitudinally at 180° F. at draw ratio 3.0, and then transversely at 180° F. at draw ratio 4.0 and heat-set at 400° F. at 5% relaxation. For these drawing conditions, the extruder RPM settings were adjusted so that the total film thickness was 12 µm and the IPET layer thickness was 1.5 µm. The Young's Modulus film properties are shown in Tables 1 and 1A. Examples 8-13

Comparative Example 3 was repeated with the exception that Hytrel 7246 was added as a blending modifier at 25, 30, 35, and 40, and 50 wt. %, respectively, replacing in each case an equal portion of PET-1. In some cases, stretching and relaxation temperatures and draw ratios had to be modified as shown in Table 1 to maintain a stable film-manufacturing process. The Young's Modulus film properties are shown in Tables 1 and 1A.

Comparative Example 4

A 48 gauge (12 µm) monolayer polyester film was prepared by extruding a 97:3 blend of resins PET-1 and PET-2 (i.e., in the absence of a formability enhancer). The extruded melt curtain was cast on a cooling drum held at 70° F. and subsequently stretched longitudinally (MD) at 170° F. at draw ratio 3.0, and then transversely (TD) at 180° F. at draw ratio 4.0 and heat-set at 400° F. at 5% relaxation. The Young's Modulus film properties are shown in Tables 1 and 1A.

Examples 15-19

Comparative Example 1 was repeated with the exception that the PTT resin was added as a blending modifier at 10, 25, 35, 50 and 100 wt. %, respectively, replacing in each case an equal weight portion of PET-1 except in Example 19. In Example 19, PTT replaced the entire content of PET-1 (98% of the total) and also half of the PET-2 content (1% of the total), whereas the other half of PET-2 was replaced by "PETG-m/b." (1% of the total)). In some cases, stretching temperatures and draw ratios had to be modified as shown in Table 1 to maintain a stable process. The Young's Modulus film properties are shown in Tables 1 and 1A.

Comparative Example 5

A 48 gauge (12 µm) monolayer polyester film was prepared by extruding a 98:2 blend of resins PET-1 and PET-2 (i.e., in the absence of a formability enhancer). The extruded melt curtain was cast on a cooling drum held at 70° F. and subsequently stretched longitudinally (MD) at 180° F. at draw ratio 3.0, and then transversely (TD) at 180° F. at draw ratio 4.5 and heat-set at 400° F. at 5% relaxation. The Young's Modulus film properties are shown in Tables 1 and 1A.

Examples 20-24

Comparative Example 1 was repeated with the exception that PBT was added as a blending modifier at 10, 25, 35, 50, 99 wt. %, respectively, replacing in each case equal weight proportion of PET-1 (except in the case of example 24: in that case, PBT replaced the entire content of PET-1 (98% of the total) and also half of the PET-2 content, (1% of the total), whereas the other half of PET-2 was replaced by "PETG-m/b." (1% of the total)). In some cases, stretching temperatures and draw ratios had to be modified as shown in Table 1 to maintain a stable process. The Young's Modulus film properties are shown in Tables 1 and 1A.

Examples 25 and 26

Comparative Example 1 was repeated with the exception that Griltex 1939 was added as a blending modifier at 5 and 10 wt. %, respectively, replacing in each case an equal weight proportion of PET-1. In Example 26, the TD stretch ratio was modified as shown in Table 1 to maintain a stable process. The Young's Modulus film properties are shown in Tables 1 and 1A.

Comparative Example 6

A 36 gauge (9 µm) two-layer polyester film was prepared by extruding a 95:5 blend of resins PET-1 and PET-2 (i.e., in the absence of a formability enhancer) through a main extruder, and 100% IPET resin through the sub-extruder. The extruded melt curtain was cast on a cooling drum held at 70° F. and subsequently stretched longitudinally at 255° F. (maximum temperature settings in the MD stretching section; actual range was 235-255° F.) at draw ratio 4.8; then transversely at 230° F. at draw ratio 4.1 and heat-set at 450° F. at 6% relaxation. For these drawing conditions, the extruder RPM settings were adjusted so that the total film thickness was 12 µm and the IPET layer thickness was 1.5 µm. The Young's Modulus film properties are shown in Tables 1 and 1A.

Example 27

Comparative Example 6 was repeated with the exception that PBT was added as a blending modifier at 25 wt. % replacing an equal weight proportion of PET-1. Stretching temperatures and draw ratios were slightly modified as shown in Table 1 to maintain a stable process. The Young's Modulus film properties are shown in Tables 1 and 1A.

Figure 12:
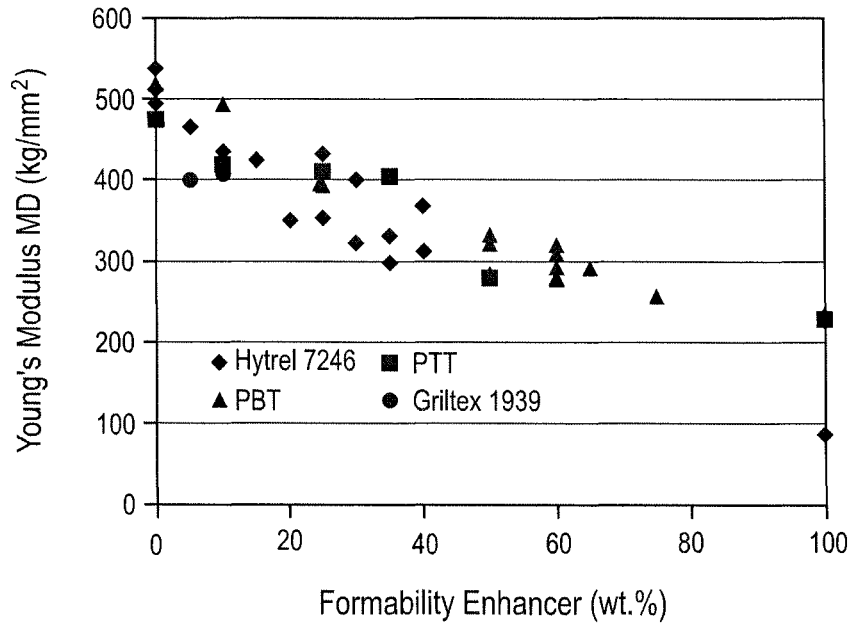
FIG. 12 is a plot showing Young Modulus (MD) versus percentage of formability enhancers.
Figure 13:
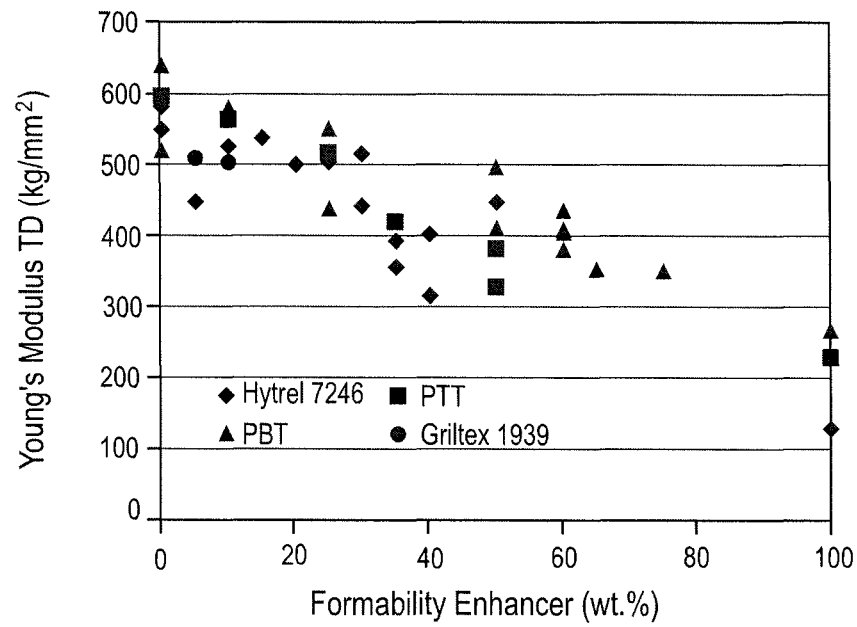
FIG. 13 is a plot showing Young Modulus (TD) versus percentage of formability enhancers.

FIGS. 12 and 13 are graphs that show the effect of the formability enhancer on the Young's Modulus data presented in Table 1.

Film Conversion

The films of Examples 3-7 and Comparative Example 2 were then metallized with aluminum (metallic barrier layer 18) to a first layer 12 (PET-1 and PET-2 blend discussed above) so as to obtain an optical density of 2.8. Prior to metallization, a plasma-treatment process was used in the metalizing chamber to prepare the surface of the first layer 12 for the metal deposition. The energy density of the treatment was approximately 1 kJ/m$^2$ and nitrogen gas was used.

A second layer 14 (IPET) was attached to the first layer 12 on an opposite surface of the metallic layer 18. The surface of the second layer was corona-treated and was coated with and a solution to form an anchor layer 34 (solution of Mica® A-131-X from Mica Corp.) using a gravure coater. The anchor layer 34 was dried in a convective dryer. The dried anchor layer was then extrusion-coated with a sealant layer 26 (LLDPE) using Dow Chemical Co. Dowlex™ 3010 at a 13.6 µm thickness at a temperature of 600° F. The anchor layer 34 was located between the second layer 14 and the sealant layer 26.

The properties of the converted films (webs) are summarized in Table 2 below. This data indicated that the trend of increased formability (manifested by reduced modulus) displayed by the polyester film as the formability enhancer increased was preserved in the converted webs. The data further showed the unexpected result of an improved heat seal (of the extrusion-coated sealant layer (LLDPE) on itself) resulting from the webs. While not being bound by theory, this may be related to the improved formability and reduced stiffness of the base film.

TABLE 2

| Example | Description | Web Y. Modulus (MD) (kg/mm$^2$) | Web Y. Modulus (TD) (kg/mm$^2$) | O2 TR (cc/100 in$^2$/day) | Heat Seal Force (kg) | Extension (in) |
|---|---|---|---|---|---|---|
| Comp. 2 | 0% Hytrel ® | 217 | 283 | 0.20 | 3.74 | 0.92 |
| 3 | 15% Hytrel ® | 171 | 233 | 0.20 | 3.58 | 1.93 |
| 4 | 20% Hytrel ® | 153 | 221 | 0.23 | 4.32 | 4.33 |
| 5 | 25% Hytrel ® | 144 | 201 | 0.26 | 3.81 | 3.9 |
| 6 | 30% Hytrel ® | 171 | 212 | 0.25 | 4.28 | 3.95 |
| 7 | 35% Hytrel ® | 194 | 223 | 0.30 | 2.86 | 2.01 |

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

We claim:

1. A method of forming a formable biaxially-oriented film, the method comprising:
   dry blending a mixture comprising crystalline polyester and a formability enhancer;
   extruding the dry-blended mixture comprising the crystalline polyester and the formability enhancer to form a first layer, the first layer comprising from about 40 to about 60 wt. % of the crystalline polyester and from about 40 to about 60 wt. % of the formability enhancer, the formability enhancer assisting in increasing the polymeric chain flexibility, the formability enhancer having a melting point less than about 230° C.; and forming the formable biaxially-oriented film comprising at least the first layer, wherein the film has a MD and a TD Young's Modulus of at least 10% lower than the first layer in the absence of the formability enhancer, wherein the MD stretching ratio of the film is from about 2 to about 6, and the TD stretching ratio of the film is from about 2 to about 5.

2. The method of claim 1, wherein the MD stretching ratio of the film is from about 3 to about 4.5, and the TD stretching ratio of the film is from about 3 to about 4.5.

3. The method of claim 1, wherein the formability enhancer is a homopolymer or copolymer comprising repeating units of trimethylene terephthalate.

4. The method of claim 1, wherein the formability enhancer is a homopolymer or copolymer comprising repeating units of butylene terephthalate.

5. The method of claim 1, wherein the formability enhancer is a copolyester elastomer.

6. The method of claim 1, wherein the formability enhancer is a polyester comprising repeating units of at least one aliphatic dicarboxylic acid or a polyester having more than four methylene groups from aliphatic diols within repeating units.

7. The method of claim 1, wherein the film has a MD and TD Young's Modulus of at least 20% lower than the first layer in the absence of the formability enhancer.

8. The method of claim 7, wherein the film has a MD and a TD Young's Modulus of at least 40% lower than the first layer in the absence of the formability enhancer.

9. The method of claim 1, wherein the crystalline polyester includes homopolyesters or copolyesters of polyethylene terephthalate, polyethylene naphthalate, polyethylene terephthalate-co-isophthalate copolymer, polyethylene terephthalate-co-naphthalate copolymer, polycyclohexylene terephthalate, polyethylene-co-cyclohexylene terephthalate, polyether-ester block copolymer, ethylene glycol or terephthalic acid-based polyester homopolymers and copolymers, or combinations thereof.

10. The method of claim 9, wherein the crystalline polyester includes homopolyesters or copolyesters of polyethylene terephthalate.

11. The method of claim 1, wherein the thickness of the film is from about 2 µm to about 350 µm.

12. The method of claim 11, wherein the thickness of the film is from about 3 µm to about 50 µm.

13. The method of claim 12, wherein the thickness of the film is from about 10 µm to about 25 µm.

14. A method of forming a formable biaxially-oriented film, the method comprising:

dry blending a mixture comprising crystalline polyester and a formability enhancer;

extruding the dry-blended mixture comprising the crystalline polyester and the formability enhancer to form a first layer, the first layer comprising from about 40 to about 60 wt. % of the crystalline polyester and from about 40 to about 60 wt. % of the formability enhancer, the formability enhancer assisting in increasing the polymeric chain flexibility, the formability enhancer having a melting point less than about 230° C.;

extruding a second layer comprising an amorphous copolyester; and forming the formable biaxially-oriented film comprising at least the first layer and the second layer, the second layer being adjacent to the first layer, wherein the film has a MD and a TD Young's Modulus of at least 10% lower than a film including the first layer in the absence of the formability enhancer and the second layer, wherein the MD stretching ratio of the film is from about 2 to about 6 and the TD stretching ratio of the film is from about 2 to about 5.

15. The method of claim 14, wherein the MD stretching ratio of the film is from about 3 to about 4.5 and the TD stretching ratio of the film is from about 3 to about 4.5.

16. The method of claim 14, wherein the amorphous copolyester includes isophthalate modified copolyesters, sebacic acid modified copolyesters, diethyleneglycol modified copolyesters, triethyleneglycol modified copolyesters, cyclohexanedimethanol modified copolyesters, or combinations thereof.

17. The method of claim 14, further including extruding a third layer, the third layer comprising an amorphous copolyester, and attaching the first layer to the second and third layers.

18. The method of claim 14, further including providing a third layer, the third layer being a metallic barrier layer, and attaching the first layer to the second and third layers.

19. The method of claim 18, wherein the metallic barrier layer includes aluminum.

20. The method of claim 14, wherein the film has a MD and a TD Young's Modulus of at least 20% lower than a film including the first layer in the absence of the formability enhancer and the second layer.

21. The method of claim 20, wherein the film has a MD and a TD Young's Modulus of at least 40% lower than a film including the first layer in the absence of the formability enhancer and the second layer.

22. A method of forming a formable biaxially-oriented film, the method comprising:

dry blending a mixture comprising crystalline polyester and a formability enhancer;

extruding the dry-blended mixture comprising the crystalline polyester and the formability enhancer to form a first layer, the first layer comprising from about 40 to about 60 wt. % of the crystalline polyester and from about 40 to about 60 wt. % of the formability enhancer, the formability enhancer assisting in increasing the polymeric chain flexibility, the formability enhancer having a melting point less than about 230° C.; and forming the formable biaxially-oriented film comprising at least the first layer, wherein the film has a composite MD and TD Young's Modulus of less than about 500 kg/mm$^2$, wherein the MD stretching ratio of the film is from about 2 to about 6, and the TD stretching ratio of the film is from about 2 to about 5.

23. The method of claim 22, wherein the MD stretching ratio of the film is from about 3 to about 4.5 and the TD stretching ratio of the film is from about 3 to about 4.5.

24. The method of claim 22, wherein the film has a composite MD and TD Young's Modulus of less than about 475 kg/mm$^2$.

25. The method of claim 22, wherein the film has a composite MD and TD Young's Modulus of less than about 450 kg/mm$^2$.

* * * * *